US012591756B1

(12) United States Patent
Gunther

(10) Patent No.: US 12,591,756 B1
(45) Date of Patent: Mar. 31, 2026

(54) SYSTEM AND METHOD FOR INLAY VALIDATION EMPLOYING INLAY INDEXING

(71) Applicant: George Schmitt & Co., Inc, Guilford, CT (US)

(72) Inventor: William G. Gunther, Essex, CT (US)

(73) Assignee: George Schmitt & Co., Inc, Guilford, CT (US)

( * ) Notice: Subject to any disclaimer, the term of this patent is extended or adjusted under 35 U.S.C. 154(b) by 0 days.

(21) Appl. No.: 19/320,142

(22) Filed: Sep. 5, 2025

(51) Int. Cl.
*G06K 19/077* (2006.01)

(52) U.S. Cl.
CPC .................................. *G06K 19/077* (2013.01)

(58) Field of Classification Search
CPC .................................................... G06K 19/077
USPC .......................................................... 235/492
See application file for complete search history.

(56) References Cited

U.S. PATENT DOCUMENTS

| | | | |
|---|---|---|---|
| 8,674,811 B2 | 3/2014 | Huang | |
| 8,896,425 B1 | 11/2014 | Martin | |
| 2006/0145710 A1* | 7/2006 | Puleston | G06K 7/0008 |
| | | | 702/182 |
| 2010/0038424 A1* | 2/2010 | Bashan | G06K 7/0095 |
| | | | 235/439 |
| 2010/0156640 A1 | 6/2010 | Forster | |
| 2012/0249303 A1 | 10/2012 | Hadley et al. | |
| 2022/0148726 A1 | 5/2022 | Costantino | |
| 2022/0230125 A1 | 7/2022 | Vedantam et al. | |
| 2022/0318532 A1 | 10/2022 | Roth | |
| 2023/0394270 A1* | 12/2023 | Weakley | G06K 7/10089 |
| 2024/0013014 A1 | 1/2024 | Bleckmann et al. | |

* cited by examiner

*Primary Examiner* — Daniel A Hess
(74) *Attorney, Agent, or Firm* — Forge IP, PLLC

(57) ABSTRACT

A system for carrying out a testing procedure on wireless inlays carried on a web and spaced at a pitch (P) includes a group of singulation readers that simultaneously interrogate a group of inlays during a read operation, each reader interrogating a single inlay during each read operation. The inlays are indexed into groups, with each index group constituting a number of inlays equal to a number (N) of the readers. The readers are spaced apart by a distance equal to the pitch (P) of the inlay spacing times a multiplier (M), where the multiplier (M) is a whole number between 1 and the number (N) of readers. The multiplier (M) is selected such that it is not a number evenly divisible into the number (N) of readers or a multiple of a number evenly divisible into the number (N) of readers.

22 Claims, 5 Drawing Sheets

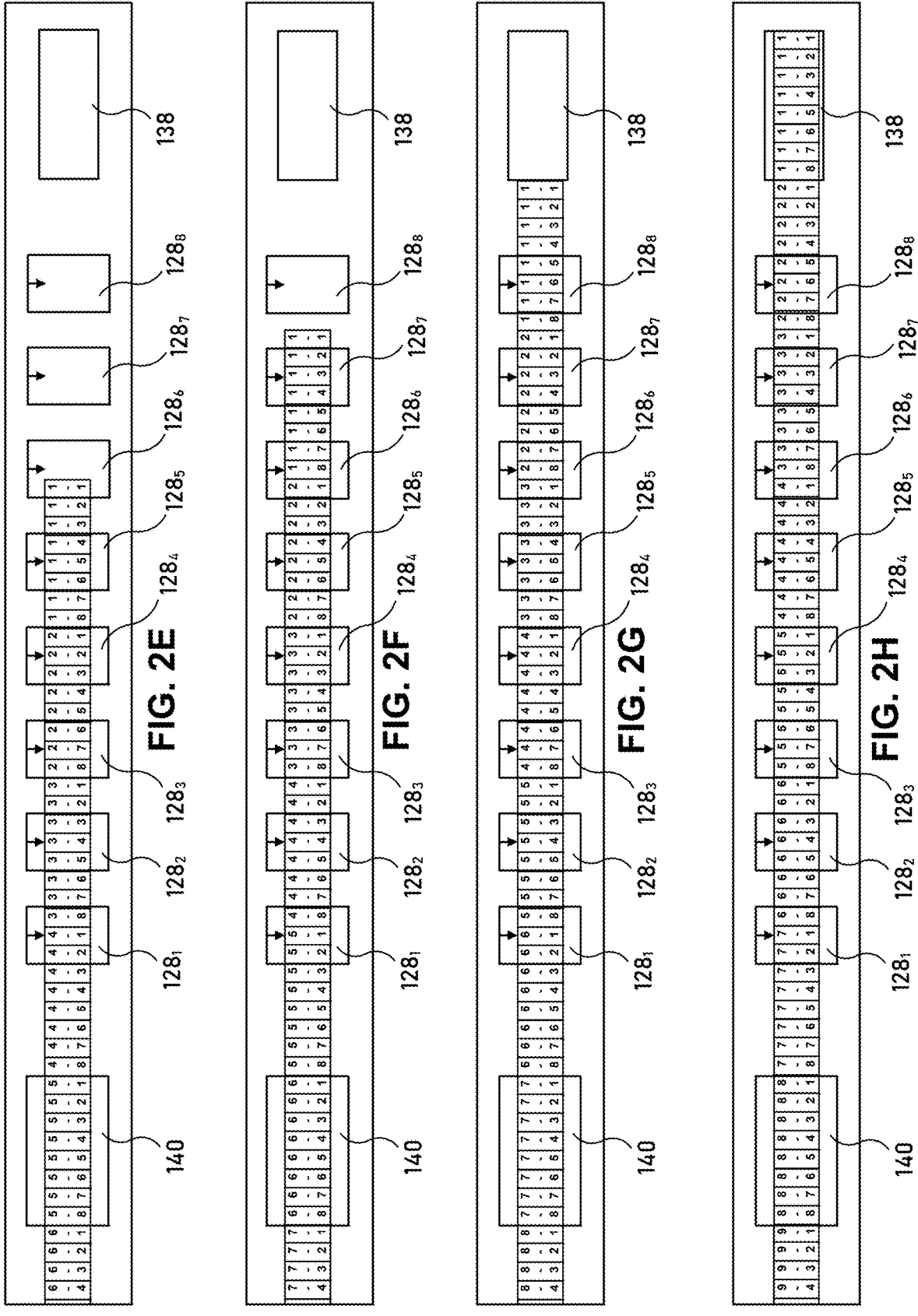

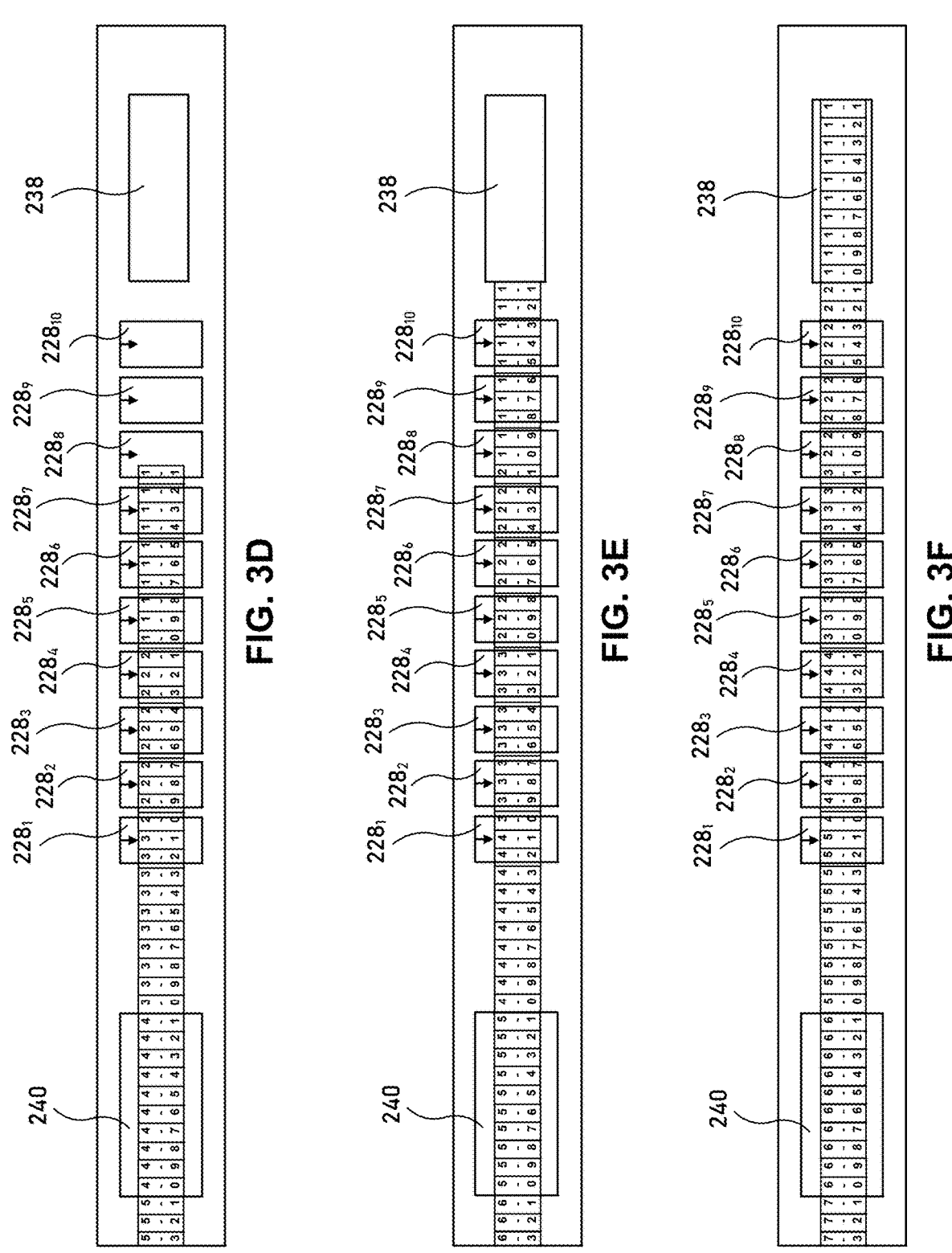

SYSTEM AND METHOD FOR INLAY VALIDATION EMPLOYING INLAY INDEXING

FIELD OF THE INVENTION

This disclosure relates generally to a system and method for testing wireless inlays, such as Bluetooth Low Energy (BLE) inlays and Radio Frequency Identification (RFID) inlays, and more specifically to such systems and methods that simultaneously read groups of wireless inlays employing isolation devices not spaced equally with the pitch of the wireless inlays.

BACKGROUND OF THE INVENTION

The adoption of Radio Frequency Identification (RFID) for tracking items has grown exponentially over the past few decades. Today, billions of products ranging from closely controlled pharmaceuticals to garments and tires are being tracked each year using small programmable inlays. Each inlay contains an etched antenna, which harvests energy from radio waves, and a silicon chip. Most RFID tracking of consumer goods is accomplished with passive RFID. The inlays have no internal power supply and rely on backscatter to "reflect" a modulated signal back to a specific reader (radio transceiver). Communication with passive RFID is accomplished through discrete read commands from the reader, which causes the inlay to respond with its pre-programmed message. "Active" RFID utilizes inlays that have their own internal power source. These inlays can perform real time functions, such as sensing temperature and other environmental conditions, but they cost significantly more than passive RFID inlays.

Bluetooth Low Energy (BLE) inlays represent the next generation in asset tracking. There are similarities between RFID and BLE inlays, but there are also important differences. BLE inlays have a programmable chip attached to an antenna, but they also have an internal capacitor. RFID operates in the 928 mHz +/−band, while BLE broadcasts at 2.4 gHz. BLE inlays harvest the ubiquitous Bluetooth Rf energy, and using this energy, can perform much like active RFID inlays, but at a cost very close to that of passive RFID inlays. BLE inlays can sense temperature and humidity, and when connected to Wifi with GPS capability, their real time location can be tracked. This can be important in developing and reducing the carbon footprint of consumer products. Retailers can be assured that their perishable products have been stored in safe environmental conditions.

The goal of organizations using either RFID or BLE is 100% reliable communication between the reader and the inlay. Inlay manufacturers cannot guarantee that 100% of their inlays are functional. Inlays may be non-responsive due to chip damage, or their performance can be intermittent due to poor bonding between the chip and the antenna. It is the job of the converter who incorporates the inlay into a label or tag to verify the performance of the finished RFID/BLE product. All RFID inlays are programmed with unique identifying numbers (UID's). Testing of individual inlays is relatively straightforward, because the rapid response time of a UHF chip facilitates singulation at production speeds. The position of non-responsive RFID inlays can easily be known, and they can be removed from the reel of inlays.

By contrast, BLE inlays operate in an environment where they may be energized by any Bluetooth device in their vicinity. For this reason, the packets of information will often be encrypted. Decryption requires a key, and that occurs after the packet is acquired by a Bluetooth device and sent via a Wifi server for downstream analysis. Ascertaining the unique identity of each BLE inlay while performing real time testing is, therefore, challenging. Hence there is a need for a testing apparatus and methodology that is specifically designed to test BLE inlays.

BLE inlays typically have a dimension of 1.25 inches to 1.5 inches in the feed direction, are spaced less than 0.25 inches apart, and can be read at distances of 20 to 30 feet. They present significant challenges in attempting to isolate a single tag and to capture a response solely from that inlay. Necessarily, devices used to isolate inlays such as waveguides (or any other device) require shielding, which will make them much larger than the pitch of the inlays on a web. However, testing only a single inlay at a time with only a single reader would take a significant amount of time.

Thus, there is a need for a system and method for testing inlays (e.g., BLE inlays and/or RFID inlays) that can simultaneously test multiple inlays, but that allows for the readers, including their isolation mechanisms (whether waveguides or otherwise), to be spaced at a greater distance than the pitch of the inlays.

SUMMARY OF THE INVENTION

The present invention is meant to provide just such a solution, by provision of a system for carrying out a testing procedure on wireless inlays that are carried on a web, the inlays being spaced on the web at a pitch (P). The system includes a plurality of singulation readers that simultaneously interrogate a plurality of inlays during a read operation, each singulation reader interrogating a single inlay during each read operation and determining whether or not each interrogated inlay is functioning within defined parameters. The inlays are indexed into groups, with each index group comprising a number of inlays equal to a number (N) of the plurality of singulation readers. The plurality of singulation readers are spaced apart from one another by a distance equal to the pitch (P) of the inlay spacing times a multiplier (M), wherein the multiplier (M) is a whole number greater than 1 and less than the number (N) of singulation readers. The multiplier (M) is selected such that the multiplier (M) is not a number evenly divisible into the number (N) of singulation readers or a multiple of a number evenly divisible into the number (N) of singulation readers.

In some embodiments, during the testing procedure, all inlays are read by a singulation reader, but no inlays are read by more than one singulation reader. In some embodiments, the web is advanced by one index group between each read operation. In some embodiments, a bar code reader simultaneously reads all inlays comprising each index group during each read operation.

In some embodiments, an automatic reject apparatus disposed downstream of the plurality of singulation readers removes from the web any inlay determined during a read operation not to be functioning within the defined parameters, based at least in part on a position of the singulation reader interrogating the inlay determined not to be functioning within the defined parameters with respect to a reject gate of the automatic reject apparatus.

In some embodiments, each singulation reader comprises a waveguide. In some embodiments, the inlays comprise Bluetooth Low Energy (BLE) inlays or Radio Frequency Identification (RFID) inlays. In certain of these embodiments, the energizing device operates at approximately 2.4 Ghz or at approximately 900 Mhz.

In some embodiments, an encoder tracks respective positions of inlays carried on the web as the inlays travel through the system. In some embodiments, a print head visually marks defective inlays.

In some embodiments, the number (N) of the plurality of singulation readers and the corresponding number of inlays comprising each index group is 5 and the multiplier (M) is 2, 3 or 4. In some embodiments, the number (N) of the plurality of singulation readers and the corresponding number of inlays comprising each index group is 6 and the multiplier (M) is 5. In some embodiments, the number (N) of the plurality of singulation readers and the corresponding number of inlays comprising each index group is 7 and the multiplier (M) is 2, 3, 4, 5 or 6. In some embodiments, the number (N) of the plurality of singulation readers and the corresponding number of inlays comprising each index group is 8 and the multiplier (M) is 3, 5 or 7. In some embodiments, the number (N) of the plurality of singulation readers and the corresponding number of inlays comprising each index group is 9 and the multiplier (M) is 2, 4, 5, 7 or 8. In some embodiments, the number (N) of the plurality of singulation readers and the corresponding number of inlays comprising each index group is 10 and wherein multiplier (M) is 3, 7 or 9. In some embodiments, the number (N) of the plurality of singulation readers and the corresponding number of inlays comprising each index group is 11 and the multiplier (M) is 2, 3, 4, 5, 6, 7, 8, 9 or 10. In some embodiments, the number (N) of the plurality of singulation readers and the corresponding number of inlays comprising each index group is 12 and the multiplier (M) is 5, 7 or 11.

In some embodiments, the pitch (P) of the inlay spacing is 1.25 inches or 1.50 inches. In some embodiments, the system further includes at least one energizing device that energizes the inlays, and the plurality of singulation readers are disposed downstream of the energizing device.

In accordance with another aspect of the present invention, a system for carrying out a testing procedure on wireless inlays that are carried on a web, the inlays being spaced on the web at a pitch (P), comprises a plurality of singulation readers that simultaneously interrogate a plurality of inlays during a read operation, each singulation reader interrogating a single inlay during each read operation and determining whether or not each interrogated inlay is functioning within defined parameters. The inlays are indexed into groups, with each index group comprising a number of inlays equal to a number (N) of the plurality of singulation readers. The plurality of singulation readers are spaced apart from one another by a distance equal to the pitch (P) of the inlay spacing times a multiplier (M), wherein the multiplier (M) is a whole number greater than 1 and less than the number (N) of singulation readers. The multiplier (M) is selected such that during the testing procedure, all inlays are read by a singulation reader, but no inlays are read by more than one singulation reader. The web is advanced by one index group between each read operation.

In some embodiments, the multiplier (M) is selected such that the multiplier (M) is not a number evenly divisible into the number (N) of singulation readers or a multiple of a number evenly divisible into the number (N) of singulation readers.

Other features and advantages of the invention will become more apparent from consideration of the following drawings and written description.

BRIEF DESCRIPTION OF THE DRAWING

FIGS. 2A-2H are schematic representations showing, in more detail and at different steps, operation of an indexing aspect of a system for testing inlays in accordance with an exemplary embodiment of the present invention, in which eight readers are employed, which indexing methodology may be employed with the system illustrated in FIG. 1; and FIGS. 3A-3F are schematic representations showing, in more detail and at different steps, operation of an indexing aspect of a system for testing inlays in accordance with another exemplary embodiment of the present invention, in which ten readers are employed, which indexing methodology may be employed with the system illustrated in FIG. 1.

DETAILED DESCRIPTION OF THE INVENTION

Figure 1:
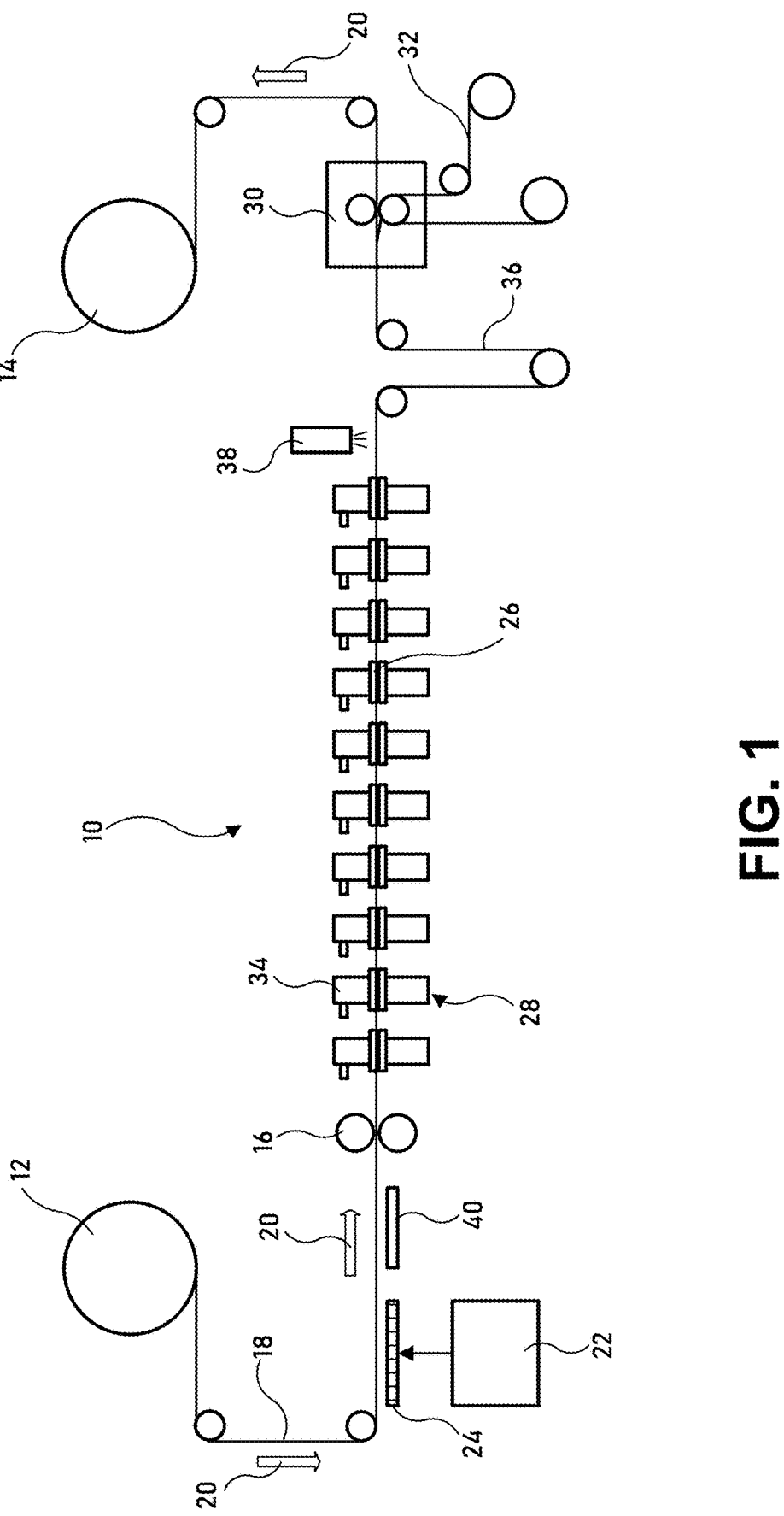
FIG. 1 is a schematic representation depicting a system for testing inlays that are carried on a web, and for removing from the web inlays that are not functioning within defined parameters in connection with which the inventive inlay indexing aspect of the present invention may be employed.

The present invention may be further understood with reference to the following description and the appended drawing, wherein like elements are referred to with like reference numerals.

Referring first to the appended FIG. 1, a system (10) constructed in accordance with an exemplary embodiment of the present invention includes an unwind apparatus (12), a rewind apparatus (14), and an encoder (16) to track the position of inlays disposed on a web (18) as they move through the system (indicated by arrows 20). As these components and such an arrangement are extremely well known in the art, these aspects of the system (10) are not discussed in detail herein.

A Bluetooth (2.4 Ghz) and/or a UHF (900 Mhz) device (22), including an antenna (24), may be provided to energize a group of inlays entering the system, and an array of antennae (26) connected to separate Bluetooth readers (28) and shielded for isolation from one another (hereinafter referred to as "singulation readers") are disposed along the web (18), as discussed in more detail below. An automatic reject apparatus (30) removes malfunctioning relays from the web (18), and separates them, for example, by redirecting them onto a reject web (32).

Inlays may be pre-energized by the energizing device (22) to reduce the response time in the downstream singulation readers (28). When reference is made to "downstream" or "upstream" herein, it should be understood that such reference is made with respect to movement of the web (18) in the direction shown by arrows (20). The singulation readers (28) capture the response from live inlays at precise locations relative to a reject gate associated with the reject apparatus (30). Inlays which fail to properly respond (i.e., which are not functioning within defined parameters) also have a known position (discussed in substantially more detail below) and will automatically be rejected downstream.

Waveguides (34) (or other devices) may be used to isolate individual inlays in the singulation reader section. A waveguide (34), which may be circular or rectangular in cross section, is a tunnel with dimensions that are particular to a specific frequency range, and in the TE10 mode, propagates a Rf wave very efficiently without outside electrical interference. In this case, the waveguides (34) effectively isolate individual inlays and eliminate "cross-talk" between adjacent inlays, which is an important aspect of the present invention. In addition, the pure "e" field within the waveguides (34) may reduce the response time of BLE inlays. Finally, since BLE inlays must perform in the Rf "e" field, their ability to respond at a preset power threshold in the waveguides (34) is predictive of their performance at a given distance in real world applications. This is highly advantageous when compared to the current state-of-the-art which couples and tests Bluetooth inlays in the magnetic or "near field."

Nevertheless, near field couplers may also be used in the system (10) to singulate inlays to reduce cost. Any array of antennae/readers (26, 28) employing waveguides (34) used to singulate inlays in the method described herein are discussed herein, although other means for singulating inlays may be employed in addition to or instead of waveguides.

UHF RFID inlays require about 20 milliseconds from the time of an energizing read command to the time of response. The same cycle for a BLE inlay may take a second or more. Using the methodology discussed herein can reduce cycles for BLE testing to close to that of UHF RFID inlays. BLE chips must calibrate and perform other functions before "advertising" a data packet.

In testing mode, the system cycles intermittently between stationary read mode and transport mode. In the exemplary system illustrated in FIG. 1, the cycle and transport modes are 1 second each and there is an array of 10 singulation antennae (26) attached to Bluetooth readers (28). It should be recognized, however, that the number of singulation antenna may vary, so long as a plurality are provided. Inlays are energized as they enter the system. During energizing, the capacitors of the inlays are pre-charged, such that the inlays are ready to calibrate and transmit their relevant data as soon as they reach the singulation reader section. Given a latency of 700 milliseconds to initially power up and calibrate and the variable time to broadcast packets, all inlays will be pre-energized for up to 3 seconds before reaching the singulation reader section.

In this example, groups of 10 inlays are indexed into the singulation section and remain stationary for 1 second. Each singulation antenna/reader "listens" for a series of information packets which contain a unique identifier. No response within the time allotted or a response that does not meet preset parameters will cause that inlay to be electronically marked as defective (i.e., not functioning within defined parameters). Since the distance of each singulation antenna from the reject gate is known in encoder counts, defective inlays may be automatically removed when that inlay reaches the reject position.

It should be noted that the transport and read time parameters may be adjusted for maximum testing performance. Because inlays are rejected most easily from a continuously moving web, an accumulator (36) may be provided between the singulation antennae (26) and the reject apparatus (30) to translate the intermittent motion of the web (18) into a continuous motion between the singulation antennae and the reject gate.

If desired, an ink jet print head (38) or the like may be provided to visually mark defective inlays so that they are not accidentally used and so that it can be confirmed that all defective inlays are removed by the reject apparatus (30). Also if desired, an optical reader (40), such as a bar code reader, may be provided to match the inlay with the BLE reading.

An alternative mode of operation to accommodate individually cut inlays is also possible. In this mode, individual inlays are fed onto a moving vacuum belt and transport through the system is provided up to the reject section. The operation in this mode is identical to the web-fed version, and the belt creates a virtual "web."

Turning now to FIGS. 2A-2H, operation of an indexing aspect of a system for testing inlays in accordance with an exemplary embodiment of the present invention is shown at different steps. In this particular exemplary embodiment, eight singulation readers ($128_1$-$128_8$) are employed, although it should be understood that a fewer or greater number of readers may be employed.

BLE inlays typically have a dimension of 1.25 inches-1.50 inches in the feed direction, are typically spaced less than 0.25 inches apart, and can typically be read at distances of 20 to 30 feet. They present significant challenges in attempting to isolate a single tag and to capture a response solely from that inlay. Typically, devices used to isolate inlays, such as waveguides (or any other device) require shielding, which will make them larger (sometimes much larger) than the pitch of the inlays on a web. Thus, the singulation readers must be spaced apart by a dimension greater than the pitch of the inlays.

An integral part of the present invention is the methodology used to ensure that all inlays are read while indexing groups through a plurality of singulation readers which are not spaced equal to the pitch of the inlays. In this methodology, the singulation readers are spaced some multiplier (M) of the pitch (P) of the inlays being read. For example, if the inlays have a pitch of 1.25 inches, the isolation devices are equally spaced by a distance equal to:

$$(P)*(M)$$

or $$1.25 \text{ inches}*(M)$$

Similarly, if the inlays have a pitch of 1.50 inches, the isolation devices are equally spaced by a distance equal to:

$$1.50 \text{ inches}*(M)$$

However, in accordance with the present invention, not all values of the multiplier (M) will provide an appropriate spacing so as to ensure that all inlays are read. In this regard, it has been found that appropriate values of the multiplier (M) are those whole numbers greater than 1 (since, as discussed above, the size of the singulation readers does not allow for this spacing), less than the number (N) of singulation readers being employed, and also selected such that the multiplier (M) is not a number evenly divisible into the number (N) of singulation readers or a multiple of a number evenly divisible into the number (N) of singulation readers. It has been found that by satisfying these criteria, no inlays are skipped, while at the same time no inlays are read by more than one singulation reader.

Acceptable multipliers (M) have been determined for various exemplary numbers (N) of singulation readers being employed (with corresponding number of inlays being indexed), as shown in the following table:

TABLE 1

| Acceptable multipliers (M) based on number of readers (N). | |
| --- | --- |
| Number of Readers (N) | Acceptable Multipliers (M) |
| 5 | 2, 3, 4 |
| 6 | 5 |
| 7 | 2, 3, 4, 5, 6 |
| 8 | 3, 5, 7 |
| 9 | 2, 4, 5, 7, 8 |
| 10 | 3, 7, 9 |
| 11 | 2, 3, 4, 5, 6, 7, 8, 9, 10 |
| 12 | 5, 7, 11 |

Of course, it should be recognized, however, that fewer than 5 singulation readers may be employed (i.e., N may be less than 5) or more than 12 singulation readers may be employed (i.e., N may be greater than 12).

Referring now to FIGS. 2A-2H, a specific example employing the inventive indexing methodology is shown. In this particular exemplary embodiment, eight singulation readers ($128_1$-$128_8$) are employed, and the inlays are indexed in groups of eight (i.e., N=8). The inlays are numbered by indexed group and inlay number within each indexed group. For example, inlay (2-3) refers to the third inlay of the second indexed group, inlay (4-7) refers to the seventh inlay of the fourth indexed group, etc.

In this embodiment, the singulation readers ($128_1$-$128_8$) are spaced a multiplier (M) of 5 inlays apart. So, if the pitch (P) of the inlays is 1.25 inches, the spacing between singulation readers ($128_1$-$128_8$) would be 6.25 inches, if the pitch (P) of the inlays is 1.50 inches, the spacing between singulation readers ($128_1$-$128_8$) would be 7.5 inches, etc.

Figures 2A, 2B, 2C, 2D:
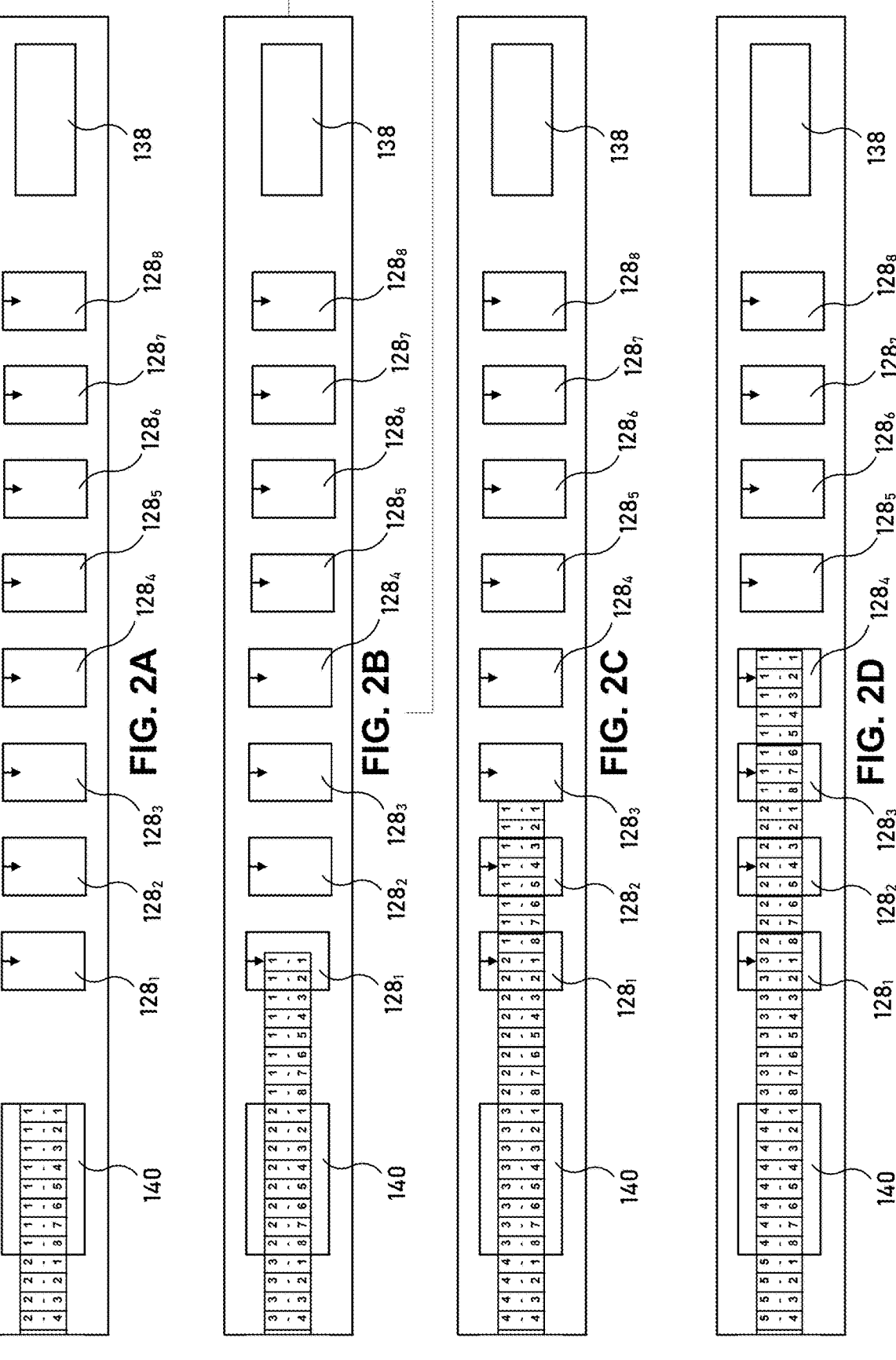

Referring now to FIG. 2A, in a first step, the inlays are advanced such that the first index group (inlays 1-1 through 1-8) are simultaneously read by the bar code reader (140). With each subsequent step (shown in FIGS. 2B-2H), the bar code reader (140) similarly reads each subsequent index group of eight inlays.

In the step shown in FIG. 2B, the inlays are advanced by an index group of eight inlays and the first inlay of the first index group (inlay 1-1) is read by singulation reader ($128_1$).

In the step shown in FIG. 2C, the inlays are further advanced by another index group of eight inlays and the first inlay of the second index group (inlay 2-1) is read by singulation reader ($128_1$), while the fourth inlay of the first index group (inlay 1-4) is read by singulation reader ($128_2$).

In the step shown in FIG. 2D, the inlays are further advanced by another index group of eight inlays and the first inlay of the third index group (inlay 3-1) is read by singulation reader ($128_1$), the fourth inlay of the second index group (inlay 2-4) is read by singulation reader ($128_2$), the seventh inlay of the first index group (inlay 1-7) is read by singulation reader ($128_3$) and the second inlay of the first index group (inlay 1-2) is read by singulation reader ($128_4$).

In the step shown in FIG. 2E, the inlays are further advanced by another index group of eight inlays and the first inlay of the fourth index group (inlay 4-1) is read by singulation reader ($128_1$), the fourth inlay of the third index group (inlay 3-4) is read by singulation reader ($128_2$), the seventh inlay of the second index group (inlay 2-7) is read by singulation reader ($128_3$), the second inlay of the second index group (inlay 2-2) is read by singulation reader ($128_4$), and the fifth inlay of the first index group (inlay 1-5) is read by singulation reader ($128_5$).

In the step shown in FIG. 2F, the inlays are further advanced by another index group of eight inlays and the first inlay of the fifth index group (inlay 5-1) is read by singulation reader ($128_1$), the fourth inlay of the fourth index group (inlay 4-4) is read by singulation reader ($128_2$), the seventh inlay of the third index group (inlay 3-7) is read by singulation reader ($128_3$), the second inlay of the third index group (inlay 3-2) is read by singulation reader ($128_4$), the fifth inlay of the second index group (inlay 2-5) is read by singulation reader ($128_5$), the eighth inlay of the first index group (inlay 1-8) is read by singulation reader ($128_6$), and the third inlay of the first index group (inlay 1-3) is read by singulation reader ($128_7$).

In the step shown in FIG. 2G, the inlays are further advanced by another index group of eight inlays and the first inlay of the sixth index group (inlay 6-1) is read by singulation reader ($128_1$), the fourth inlay of the fifth index group (inlay 5-4) is read by singulation reader ($128_2$), the seventh inlay of the fourth index group (inlay 4-7) is read by singulation reader ($128_3$), the second inlay of the fourth index group (inlay 4-2) is read by singulation reader ($128_4$), the fifth inlay of the third index group (inlay 3-5) is read by singulation reader ($128_5$), the eighth inlay of the second index group (inlay 2-8) is read by singulation reader ($128_6$), the third inlay of the second index group (inlay 2-3) is read by singulation reader ($128_7$), and the sixth inlay of the first index group (inlay 1-6) is read by singulation reader ($128_8$).

With respect to the final step shown in FIG. 2H, the inlays are further advanced by another index group of eight inlays, and are passed through an ink jet print head (138) or the like, which may be provided to visually mark defective inlays so that they are not accidentally used and so that it can be confirmed that all defective inlays are removed downstream.

As can be seen, with the spacing and number of singulation readers ($128_1$-$128_8$) in this particular exemplary embodiment, all eight inlays of the first index group (inlays 1-1 through 1-8) have been read in only six inlay read steps (shown in FIGS. 2B-2G).

Also as should be apparent, it can be seen that with the inventive indexing methodology of the present invention, the same inlay number of each index group is always read by the same singulation reader ($128_1$-$128_8$). For example, the first singulation reader ($128_1$) always reads the first inlay of every index group, the second singulation reader ($128_2$) always reads the fourth inlay of every index group, the third singulation reader ($128_3$) always reads the seventh inlay of every index group, etc.

With this knowledge, it can be accurately anticipated precisely which inlay should be read by which singulation reader and at what time. For example, it is known that the fourth inlay in a particular index (say, for example inlay 3-4) read by the barcode reader (140) (see FIG. 2C) should be read by the second singulation reader ($128_2$) two index steps later (see FIG. 2E). Similarly, it is known that the sixth inlay in a particular index (say, for example inlay 2-6) read by the barcode reader (140) (see FIG. 2B) should be read by the eighth singulation reader ($128_8$) six index steps later (see FIG. 2H). If the expected read is not made as anticipated, it can be concluded that the inlay in question is malfunctioning in some way, and that inlay can be appropriately marked by the ink jet print head (138) or the like and/or be removed downstream by a reject apparatus or the like.

It should be recognized, however, that which particular inlay of each index group is read by each particular singulation reader will vary depending on the spacing—which, in turn, depends on the value of the multiplier (M). The following table shows which inlay of each index is read by which singulation reader when eight singulation readers are employed (i.e., N=8) for the various acceptable values of the multiplier (M). It should be noted that the row where the multiplier (M) is equal to 5 corresponds to the exemplary embodiment discussed above in connection with FIGS. 2A-2H.

TABLE 2

| | Reader/inlay correspondence for 8 readers (N = 8). | | | | | | | |
| M | Read-er 1 | Read-er 2 | Read-er 3 | Read-er 4 | Read-er 5 | Read-er 6 | Read-er 7 | Read-er 8 |
|---|---|---|---|---|---|---|---|---|
| 3 | 1 | 6 | 3 | 8 | 5 | 2 | 7 | 4 |
| 5 | 1 | 4 | 7 | 2 | 5 | 8 | 3 | 6 |
| 7 | 1 | 2 | 3 | 4 | 5 | 6 | 7 | 8 |

It should also be noted that in the above table, it is assumed that readers are positioned with respect to the bar code scanner such that the first inlay in each index is read by the first singulation reader. However, as will be recognized by those skilled in the art, such is not strictly necessary. For example, the readers may be positioned with respect to the bar code scanner such that the third inlay in each index is read by the first singulation reader, in which case, each of the cells in the table would be shifted by 2 inlays (e.g., for M=5, the sequence would be 3, 6, 1, 4, 7, 2, 5, 8). Again, this knowledge allows one to anticipate precisely which inlay will be read by which singulation reader and at what time.

Referring now to FIGS. 3A-3F, another specific example employing the inventive indexing methodology is shown. In this particular exemplary embodiment, ten singulation readers ($228_1$-$228_{10}$) are employed, and the inlays are indexed in groups of ten (i.e., N=10). As above, the inlays are numbered by indexed group and inlay number within each indexed group. For example, inlay (2-3) refers to the third inlay of the second indexed group, inlay (4-0) refers to the tenth inlay of the fourth indexed group, etc.

In this embodiment, the singulation readers ($228_1$-$228_{10}$) are spaced a multiplier (M) of 3 inlays apart. So, if the pitch (P) of the inlays is 1.25 inches, the spacing between singulation readers ($228_1$-$228_{10}$) would be 3.75 inches, if the pitch (P) of the inlays is 1.50 inches, the spacing between singulation readers ($228_1$-$228_{10}$) would be 4.5 inches, etc.

Figures 3A, 3B, 3C:
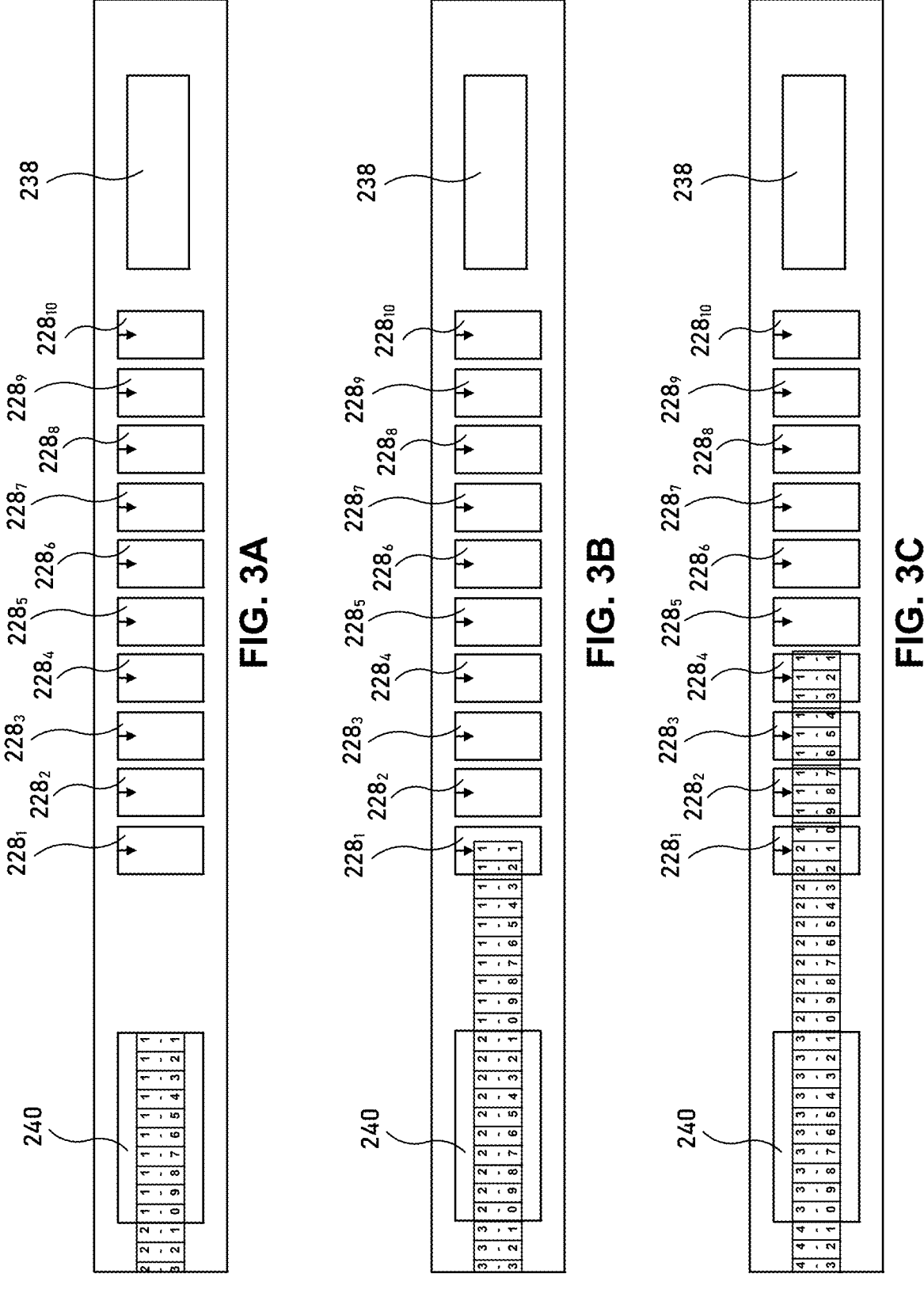

Referring now to FIG. 3A, in a first step, the inlays are advanced such that the first index group (inlays 1-1 through 1-0) are simultaneously read by the bar code reader (240). With each subsequent step (shown in FIGS. 3B-3F), the bar code reader (240) similarly reads each subsequent index group of ten inlays.

In the step shown in FIG. 3B, the inlays are advanced by an index group of ten inlays and the first inlay of the first index group (inlay 1-1) is read by singulation reader ($228_1$).

In the step shown in FIG. 3C, the inlays are further advanced by another index group of ten inlays and the first inlay of the second index group (inlay 2-1) is read by singulation reader ($228_1$), the eighth inlay of the first index group (inlay 1-8) is read by singulation reader (2282), the fifth inlay of the first index group (inlay 1-5) is read by singulation reader (2283), and the second inlay of the first index group (inlay 1-2) is read by singulation reader (2284).

In the step shown in FIG. 3D, the inlays are further advanced by another index group of ten inlays and the first inlay of the third index group (inlay 3-1) is read by singulation reader ($228_1$), the eighth inlay of the second index group (inlay 2-8) is read by singulation reader (2282), the fifth inlay of the second index group (inlay 2-5) is read by singulation reader (2283), the second inlay of the second index group (inlay 2-2) is read by singulation reader (2284), the ninth inlay of the first index group (inlay 1-9) is read by singulation reader (2285), the sixth inlay of the first index group (inlay 1-6) is read by singulation reader (2286) and the third inlay of the first index group (inlay 1-3) is read by singulation reader (2287).

In the step shown in FIG. 3E, the inlays are further advanced by another index group of ten inlays and the first inlay of the fourth index group (inlay 4-1) is read by singulation reader ($228_1$), the eighth inlay of the third index group (inlay 3-8) is read by singulation reader (2282), the fifth inlay of the third index group (inlay 3-5) is read by singulation reader (2283), the second inlay of the third index group (inlay 3-2) is read by singulation reader (2284), the ninth inlay of the second index group (inlay 2-9) is read by singulation reader (2285), the sixth inlay of the second index group (inlay 2-6) is read by singulation reader (2286), the third inlay of the second index group (inlay 2-3) is read by singulation reader (2287), the tenth inlay of the first index group (inlay 1-0) is read by singulation reader (2288), the seventh inlay of the first index group (inlay 1-7) is read by singulation reader (2289) and the fourth inlay of the first index group (inlay 1-4) is read by singulation reader ($228_{10}$).

As can be seen, with the spacing and number of singulation readers ($228_1$-$228_{10}$) in this particular exemplary embodiment, all ten inlays of the first index group (inlays 1-1 through 1-0) have been read in only four inlay read steps (shown in FIGS. 3B-3E).

With respect to the final step shown in FIG. 3F, the inlays are further advanced by another index group of ten inlays, and are passed through an ink jet print head (238) or the like, which may be provided to visually mark defective inlays so that they are not accidentally used and so that it can be confirmed that all defective inlays are removed downstream.

Again, as with the previously discussed embodiment, it can be seen that with the inventive indexing methodology of the present invention, the same inlay number of each index group is always read by the same singulation reader ($228_1$-$228_{10}$). For example, the first singulation reader ($228_1$) always reads the first inlay of every index group, the second singulation reader (2282) always reads the eighth inlay of every index group, the third singulation reader (2283) always reads the fifth inlay of every index group, etc. And in this embodiment, since indexing is done in groups of 10, it is also the case that the absolute inlay number always ends with the same digit for each singulation reader ($228_1$-$228_{10}$). For example, singulation reader (2287) reads inlays 1-3, 2-3, 3-3, 4-3, 5-3, 6-3, etc. (which correspond to inlay numbers 3, 13, 23, 33, 43, 53, etc. in the overall inlay count).

With this knowledge, as with the previously described embodiment, it can be accurately anticipated precisely which inlay should be read by which singulation reader and at what time. For example, it is known that the second inlay in a particular index (say, for example inlay 2-2) read by the barcode reader (240) (see FIG. 3B) should be read by the fourth singulation reader (2284) two index steps later (see FIG. 3D). Similarly, it is known that the fourth inlay in a particular index (say, for example inlay 1-4) read by the barcode reader (240) (see FIG. 3A) should be read by the tenth singulation reader ($228_{10}$) four index steps later (see FIG. 3E). If the expected read is not made as anticipated, it can be concluded that the inlay in question is malfunctioning in some way, and that inlay can be appropriately marked by the ink jet print head (238) or the like and/or be removed downstream by a reject apparatus or the like.

It should again be recognized, however, that which particular inlay of each index group is read by each particular singulation reader will vary depending on the spacing—which, in turn, depends on the value of the multiplier (M). The following table shows which inlay of each index is read by which singulation reader when ten singulation readers are employed (i.e., N=10) for the various acceptable values of the multiplier (M). It should be noted that the row where the multiplier (M) is equal to 3 corresponds to the exemplary embodiment discussed above in connection with FIGS. 3A-3F.

TABLE 3

| | Reader/inlay correspondence for 10 readers (N = 10). | | | | | | | | |
| M | Read 1 | Read 2 | Read 3 | Read 4 | Read 5 | Read 6 | Read 7 | Read 8 | Read 9 | Read 10 |
|---|---|---|---|---|---|---|---|---|---|---|
| 3 | 1 | 8 | 5 | 2 | 9 | 6 | 3 | 10 | 7 | 4 |
| 7 | 1 | 4 | 7 | 10 | 3 | 6 | 9 | 2 | 5 | 8 |
| 9 | 1 | 2 | 3 | 4 | 5 | 6 | 7 | 8 | 9 | 10 |

It should also be noted that in the above table, it is assumed that readers are positioned with respect to the bar code scanner such that the first inlay in each index is read by the first singulation reader. However, as will be recognized by those skilled in the art, such is not strictly necessary. For example, the readers may be positioned with respect to the bar code scanner such that the fifth inlay in each index is read by the first singulation reader, in which case, each of the cells in the table would be shifted by 5 inlays (e.g., for M=7, the sequence would be 6, 9, 2, 5, 8, 1, 4, 7, 10, 3). Again, this knowledge allows one to anticipate precisely which inlay will be read by which singulation reader and at what time.

While detailed examples are not provided (in order to avoid unnecessary repetition), the following table shows which inlay of each index is read by which singulation reader when other numbers of singulation readers are employed (i.e., N=5, 6, 7, 9, 11 or 12) and for the various acceptable values of the multiplier (M) at these corresponding values of (N).

TABLE 4

| | Reader/inlay correspondence for 5 readers (N = 5). | | | | |
| M | Reader 1 | Reader 2 | Reader 3 | Reader 4 | Reader 5 |
|---|---|---|---|---|---|
| 2 | 1 | 4 | 2 | 5 | 3 |
| 3 | 1 | 3 | 5 | 2 | 4 |
| 4 | 1 | 2 | 3 | 4 | 5 |

TABLE 5

| | Reader/inlay correspondence for 6 readers (N = 6). | | | | | |
| M | Reader 1 | Reader 2 | Reader 3 | Reader 4 | Reader 5 | Reader 6 |
|---|---|---|---|---|---|---|
| 5 | 1 | 2 | 3 | 4 | 5 | 6 |

TABLE 6

| | Reader/inlay correspondence for 7 readers (N = 7). | | | | | | |
| M | Reader 1 | Reader 2 | Reader 3 | Reader 4 | Reader 5 | Reader 6 | Reader 7 |
|---|---|---|---|---|---|---|---|
| 2 | 1 | 6 | 4 | 2 | 7 | 5 | 3 |
| 3 | 1 | 5 | 2 | 6 | 3 | 7 | 4 |
| 4 | 1 | 4 | 7 | 3 | 6 | 2 | 5 |
| 5 | 1 | 3 | 5 | 7 | 2 | 4 | 6 |
| 6 | 1 | 2 | 3 | 4 | 5 | 6 | 7 |

TABLE 7

| | Reader/inlay correspondence for 9 readers (N = 9). | | | | | | | | |
| M | Reader 1 | Reader 2 | Reader 3 | Reader 4 | Reader 5 | Reader 6 | Reader 7 | Reader 8 | Reader 9 |
|---|---|---|---|---|---|---|---|---|---|
| 2 | 1 | 8 | 6 | 4 | 2 | 9 | 7 | 5 | 3 |
| 4 | 1 | 6 | 2 | 7 | 3 | 8 | 4 | 9 | 5 |
| 5 | 1 | 5 | 9 | 4 | 8 | 3 | 7 | 2 | 6 |
| 7 | 1 | 3 | 5 | 7 | 9 | 2 | 4 | 6 | 8 |
| 8 | 1 | 2 | 3 | 4 | 5 | 6 | 7 | 8 | 9 |

TABLE 8

| | Reader/inlay correspondence for 11 readers (N = 11). | | | | | | | | | | |
| M | Read 1 | Read 2 | Read 3 | Read 4 | Read 5 | Read 6 | Read 7 | Read 8 | Read 9 | Read 10 | Read 11 |
|---|---|---|---|---|---|---|---|---|---|---|---|
| 2 | 1 | 10 | 8 | 6 | 4 | 2 | 11 | 9 | 7 | 5 | 3 |
| 3 | 1 | 9 | 6 | 3 | 11 | 8 | 5 | 2 | 10 | 7 | 4 |
| 4 | 1 | 8 | 4 | 11 | 7 | 3 | 10 | 6 | 2 | 9 | 5 |
| 5 | 1 | 7 | 2 | 8 | 3 | 9 | 4 | 10 | 5 | 11 | 6 |
| 6 | 1 | 6 | 11 | 5 | 10 | 4 | 9 | 3 | 8 | 2 | 7 |
| 7 | 1 | 5 | 9 | 2 | 6 | 10 | 3 | 7 | 11 | 4 | 8 |
| 8 | 1 | 4 | 7 | 10 | 2 | 5 | 8 | 11 | 3 | 6 | 9 |
| 9 | 1 | 3 | 5 | 7 | 9 | 11 | 2 | 4 | 6 | 8 | 10 |
| 10 | 1 | 2 | 3 | 4 | 5 | 6 | 7 | 8 | 9 | 10 | 11 |

TABLE 9

| | Read 1 | Read 2 | Read 3 | Read 4 | Read 5 | Read 6 | Read 7 | Read 8 | Read 9 | Read 10 | Read 11 | Read 12 |
|---|---|---|---|---|---|---|---|---|---|---|---|---|
| M | | | | | | | | | | | | |
| 5 | 1 | 8 | 3 | 10 | 5 | 12 | 7 | 2 | 9 | 4 | 11 | 6 |
| 7 | 1 | 6 | 11 | 4 | 9 | 2 | 7 | 12 | 5 | 10 | 3 | 8 |
| 11 | 1 | 2 | 3 | 4 | 5 | 6 | 7 | 8 | 9 | 10 | 11 | 12 |

Reader/inlay correspondence for 12 readers (N = 12).

As should be apparent to those skilled in the art, the present invention as disclosed herein provides a system and method for testing inlays (e.g., BLE inlays and/or RFID inlays) that can simultaneously test multiple inlays, but that allows for the readers, including their isolation mechanisms (whether waveguides or otherwise), to be spaced at a greater distance than the pitch of the inlays.

Although the invention has been described with reference to a particular arrangement of parts, processes, features and the like, these are not intended to exhaust all possible arrangements or features, and indeed many other modifications and variations will be ascertainable to those of skill in the art.

What is claimed is:

1. A system for carrying out a testing procedure on wireless inlays that are carried on a web, said inlays being spaced on the web at a pitch (P), said system comprising:

a plurality of singulation readers that simultaneously interrogate a plurality of inlays during a read operation, each singulation reader interrogating a single inlay during each read operation and determining whether or not each interrogated inlay is functioning within defined parameters;

wherein said inlays are indexed into groups, with each index group comprising a number of inlays equal to a number (N) of said plurality of singulation readers; and wherein said plurality of singulation readers are spaced apart from one another by a distance equal to the pitch (P) of the inlay spacing times a multiplier (M), wherein the multiplier (M) is a whole number greater than 1 and less than the number (N) of singulation readers, and wherein the multiplier (M) is selected such that the multiplier (M) is not a number evenly divisible into the number (N) of singulation readers or a multiple of a number evenly divisible into the number (N) of singulation readers.

2. The system according to claim 1, wherein during the testing procedure, all inlays are read by a singulation reader, but no inlays are read by more than one singulation reader.

3. The system according to claim 1 wherein the web is advanced by one index group between each read operation.

4. The system of claim 1 further comprising a bar code reader that simultaneously reads all inlays comprising each index group during each read operation.

5. The system of claim 1 further comprising an automatic reject apparatus disposed downstream of the plurality of singulation readers that removes from the web any inlay determined during a read operation not to be functioning within the defined parameters, based at least in part on a position of the singulation reader interrogating the inlay determined not to be functioning within the defined parameters with respect to a reject gate of the automatic reject apparatus.

6. The system of claim 1 wherein each singulation reader comprises a waveguide.

7. The system of claim 1 wherein the inlays comprise Bluetooth Low Energy (BLE) inlays or Radio Frequency Identification (RFID) inlays.

8. The system of claim 7 wherein the energizing device operates at approximately 2.4 Ghz or at approximately 900 Mhz.

9. The system of claim 1 further comprising an encoder that tracks respective positions of inlays carried on the web as the inlays travel through said system.

10. The system of claim 1 further comprising a print head that visually marks defective inlays.

11. The system of claim 1 wherein the number (N) of said plurality of singulation readers and the corresponding number of inlays comprising each index group is 5 and wherein the multiplier (M) is 2, 3 or 4.

12. The system of claim 1 wherein the number (N) of said plurality of singulation readers and the corresponding number of inlays comprising each index group is 6 and wherein the multiplier (M) is 5.

13. The system of claim 1 wherein the number (N) of said plurality of singulation readers and the corresponding number of inlays comprising each index group is 7 and wherein the multiplier (M) is 2, 3, 4, 5 or 6.

14. The system of claim 1 wherein the number (N) of said plurality of singulation readers and the corresponding number of inlays comprising each index group is 8 and wherein the multiplier (M) is 3, 5 or 7.

15. The system of claim 1 wherein the number (N) of said plurality of singulation readers and the corresponding number of inlays comprising each index group is 9 and wherein the multiplier (M) is 2, 4, 5, 7 or 8.

16. The system of claim 1 wherein the number (N) of said plurality of singulation readers and the corresponding number of inlays comprising each index group is 10 and wherein the multiplier (M) is 3, 7 or 9.

17. The system of claim 1 wherein the number (N) of said plurality of singulation readers and the corresponding number of inlays comprising each index group is 11 and wherein the multiplier (M) is 2, 3, 4, 5, 6, 7, 8, 9 or 10.

18. The system of claim 1 wherein the number (N) of said plurality of singulation readers and the corresponding number of inlays comprising each index group is 12 and wherein the multiplier (M) is 5, 7 or 11.

19. The system of claim 1 wherein the pitch (P) of the inlay spacing is 1.25 inches or 1.50 inches.

20. The system of claim 1 further comprising at least one energizing device that energizes the inlays, and wherein the plurality of singulation readers are disposed downstream of the energizing device.

21. The system according to claim 20, wherein the multiplier (M) is selected such that the multiplier (M) is not a number evenly divisible into the number (N) of singulation readers or a multiple of a number evenly divisible into the number (N) of singulation readers.

22. A system for carrying out a testing procedure on wireless inlays that are carried on a web, said inlays being spaced on the web at a pitch (P), said system comprising:

a plurality of singulation readers that simultaneously interrogate a plurality of inlays during a read operation, each singulation reader interrogating a single inlay during each read operation and determining whether or not each interrogated inlay is functioning within defined parameters;

wherein said inlays are indexed into groups, with each index group comprising a number of inlays equal to a number (N) of said plurality of singulation readers;

wherein said plurality of singulation readers are spaced apart from one another by a distance equal to the pitch (P) of the inlay spacing times a multiplier (M), wherein the multiplier (M) is a whole number greater than 1 and less than the number (N) of singulation readers, and wherein the multiplier (M) is selected such that during the testing procedure, all inlays are read by a singulation reader, but no inlays are read by more than one singulation reader; and wherein the web is advanced by one index group between each read operation.

\* \* \* \* \*